United States Patent
Tyrer

(10) Patent No.: US 6,663,162 B1
(45) Date of Patent: Dec. 16, 2003

(54) GOLF CART RETRACTABLE CANOPY

(76) Inventor: Stephen Edward Tyrer, 147 Taft Crescent, Centerport, NY (US) 11721

( * ) Notice: Subject to any disclaimer, the term of this patent is extended or adjusted under 35 U.S.C. 154(b) by 0 days.

(21) Appl. No.: 10/176,945

(22) Filed: Jun. 21, 2002

(51) Int. Cl.[7] .................................................. B60P 7/02
(52) U.S. Cl. ............................. 296/100.14; 296/77.1; 280/DIG. 5
(58) Field of Search ...................... 296/100.11, 100.14, 296/77.1, 79; 280/DIG. 5

(56) References Cited

U.S. PATENT DOCUMENTS

| 4,830,037 | A | * | 5/1989 | Held |
| 5,688,018 | A | * | 11/1997 | Simpson |
| 6,216,714 | B1 | * | 4/2001 | Tucker |
| 6,220,647 | B1 | | 4/2001 | Winkler |
| 6,227,603 | B1 | * | 5/2001 | Brock |
| 6,416,109 | B1 | | 7/2002 | Tyrer et al. |
| 6,471,281 | B1 | | 10/2002 | Tyrer et al. |
| D469,734 | S | | 2/2003 | Tyrer |
| 2002/0027373 | A1 | * | 3/2002 | Winkler |

OTHER PUBLICATIONS

Rear Bag Covertech, Rear Bag Cover http://www.rearbagcover.com, No date.
U.S. patent application Ser. No. 10/107,996, Tyrer, filed N/A.
Rear Bag Covertech, Rear Bag Cover http://www.rearbagcover.com—cited on original IDS.

* cited by examiner

Primary Examiner—Joseph D. Pape
(74) Attorney, Agent, or Firm—Michael T. York

(57) ABSTRACT

A canopy assembly for attaching a rearwardly extending protective canopy to a motorized golf cart of the type having a top covering the passenger seating area and an uncovered bag storage area reward of the seating area. The canopy assembly includes a front strut member secured to the frame assembly on the golf cart that supports the golf cart top, seat back and golf bag support bracket, a base member for supporting the pivotal frame structure of the canopy, a frame that pivotally attaches to the base member and a sheet of flexible, water-resistant material suspended over the frame. The canopy assembly may be extended where the protective canopy substantially covers the golf bag storage area of the golf cart protecting the golf bags from rainfall. The canopy assembly may be folded wherein the protective canopy is moved out of the way allowing golf clubs to be removed from the golf bags without hitting the canopy assembly.

25 Claims, 9 Drawing Sheets

GOLF CART RETRACTABLE CANOPY

FIELD OF THE INVENTION

This invention relates generally to the field of retractable golf cart canopy covers for protecting stored golf bags and clubs on a golf cart from rain.

DESCRIPTION OF THE RELATED ART

Canopy covers in the past have been utilized to protect golf bags and clubs located in the rear bag storage compartment of golf carts from rain and damp weather conditions. It is well known in the sport that wet golf club grips can hinder the performance of the player and is undesirable.

Generally, retractable canopy covers attach to the back of the cart's top and to the cart's frame. The connection to the top is typically made with an extruded channel member that accepts the top edge of the canopy. The connection to the cart's frame is made using a structural support member that serves as a mounting base for a pivotal frame supporting the canopy that is generally made up from a plurality of U-shaped struts. The base member generally attaches directly to the frame of the cart.

Connecting the canopy cover to the back of the golf cart's top is often a troublesome task that leads to less than ideal results. Golf cart tops vary significantly in design, making it difficult to develop one connection mechanism that will attach to all of the tops. In addition, the connection generally requires drilling holes in the golf cart's top to allow the insertion of rivets or screws to hold the extruded channel member in place that receives the top edge of the canopy. If the canopy is removed or replaced with a new design, the original holes look unsightly and devalue the golf cart. The holes can lead to water leaks and promote cracking of the top. The connection to the top is also difficult to seal, often water seeps between the extruded member and the cart top surface and leaks, leading to dripping on the golf bags and clubs stored in the back of the cart. Another disadvantage is that the extruded member must be placed in the exact location on the back of the cart top and secured in place. If it is slightly low, the cover will sage. If it is slightly high, the cover will be over-stretched. The problem is compounded with the wide variety of cart tops. Yet still another disadvantage with having to mount the top edge of the golf cart canopy to the top of the golf cart is that the mount is semi-permanent. Often the desire of the cart owner is to remove the rearwardly extending canopy cover during the summer months when less rainfall is expected. When the canopy is removed, the extruded channel generally remains in place leaving an unsightly additional member or is removed leaving holes in the top of the cart.

One attempt to avoid having to use the extruded channel member was U.S. Pat. No. 6,220,647 to Winkler. This invention includes an additional strut on the canopy that is mounted to the same pivotal joint that the rest of the struts are mounted on. However, this strut is not structurally stable since it is only mounted on its very end using a through-bolt. Therefore, the strut tends to wobble side to side and front to back when the cart is moving, leading to unsightly movement of the canopy cover. Winkler discloses attaching this strut to the underneath side of the rear edge of the cart top. This would stabilize the strut, however, it requires drilling holes in the cart top. The holes would be unsightly when the cover is removed, may leak, and can lead to the cart top cracking. In addition, the drilling process makes it difficult to properly install the cover and devalues the cart. Yet another disadvantage of the invention of Winkler is that many golf cart tops do not have a convenient area underneath the top to secure the top strut of the canopy. Therefore, there is not a direct way to secure the top strut of Winkler to the underneath side of the golf cart top on many golf carts.

BRIEF SUMMARY OF THE INVENTION

The present invention provides a rearwardly extending canopy assembly for golf carts that is stable and does not require attachment to the golf cart top. The present invention includes a front strut that attaches to the golf cart's frame or golf bag support bracket to provide structural support for the top edge of the canopy. Therefore, the present invention provides a rearwardly extending canopy cover that is simple to install and remove, does not require holes in the cart top for installation, does not leak and can be utilized on a wide variety of golf carts.

Other advantages and features of the present invention will become apparent when viewed in light of the subsequent description of the preferred embodiment and the appended claims, taken in conjunction with the accompanying drawings.

DETAILED DESCRIPTION OF THE PREFERRED EMBODIMENT(S)

Figure 1:
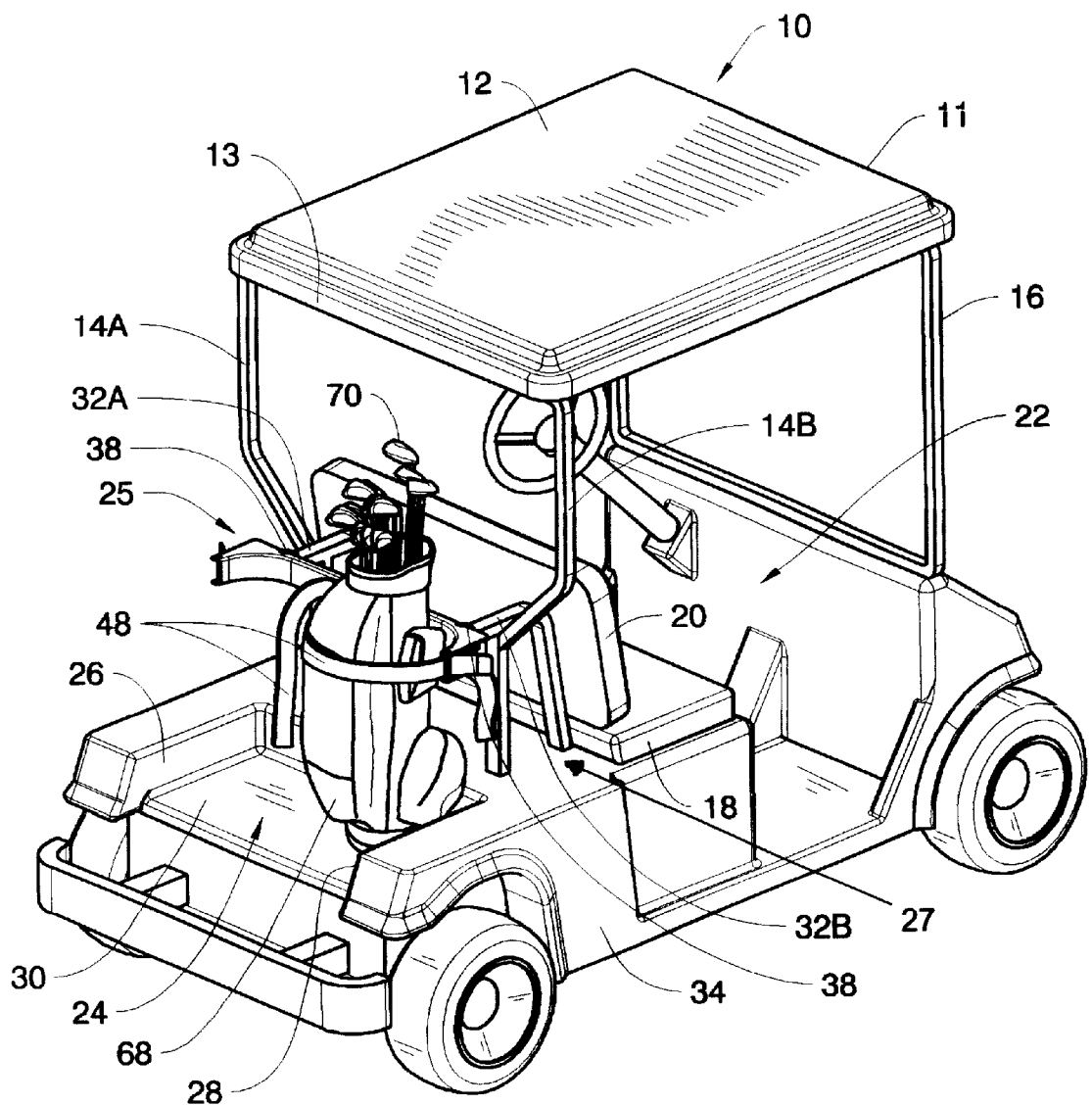
FIG. 1 is a rear perspective view of a golf cart in which an embodiment of the present invention may be used.
Figure 4:
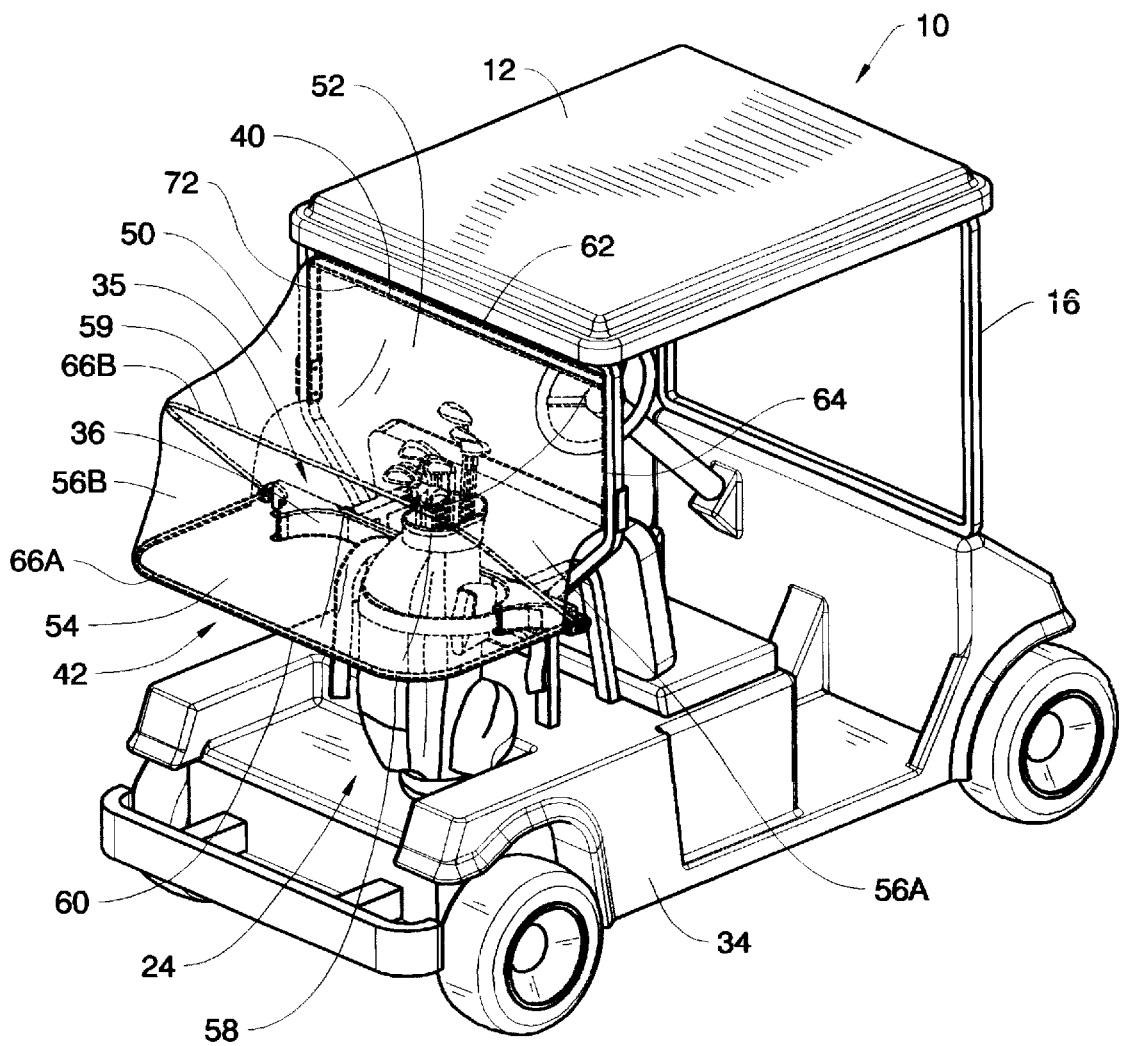
FIG. 4 is a rear perspective view of the golf cart with an embodiment of the present invention, a canopy assembly, attached to the golf cart.

FIG. 1 shows a perspective view of a motorized golf cart 10 to which an embodiment of the present invention, generally indicated as a canopy assembly 42 in FIG. 4, can be attached. Cart 10 has a top 12 that is attached to the upper ends of rear frame members 14A and 14B and the upper portion of a front frame member 16 using fasteners (not shown). Top 12 is used to protect passengers sitting in a passenger compartment 22 from rain. The passengers sit on a seat 18 with their back resting on a seat back 20. Behind seat back 20 is a bag storage area 24 formed into a body 34 of cart 10. Storage area 24 is defined by a bottom 30, two opposing sides 26, 28 and seat back 20. A golf bag support bracket 25 is mounted to frame extensions 32A and 32B above bag storage area 24. Frame extensions 32A and 32B and rear frame members 14A and 14B can be attached together forming a frame assembly 27 that supports cart top 12, seat back 20, and golf bag support bracket 25.

Figure 2:
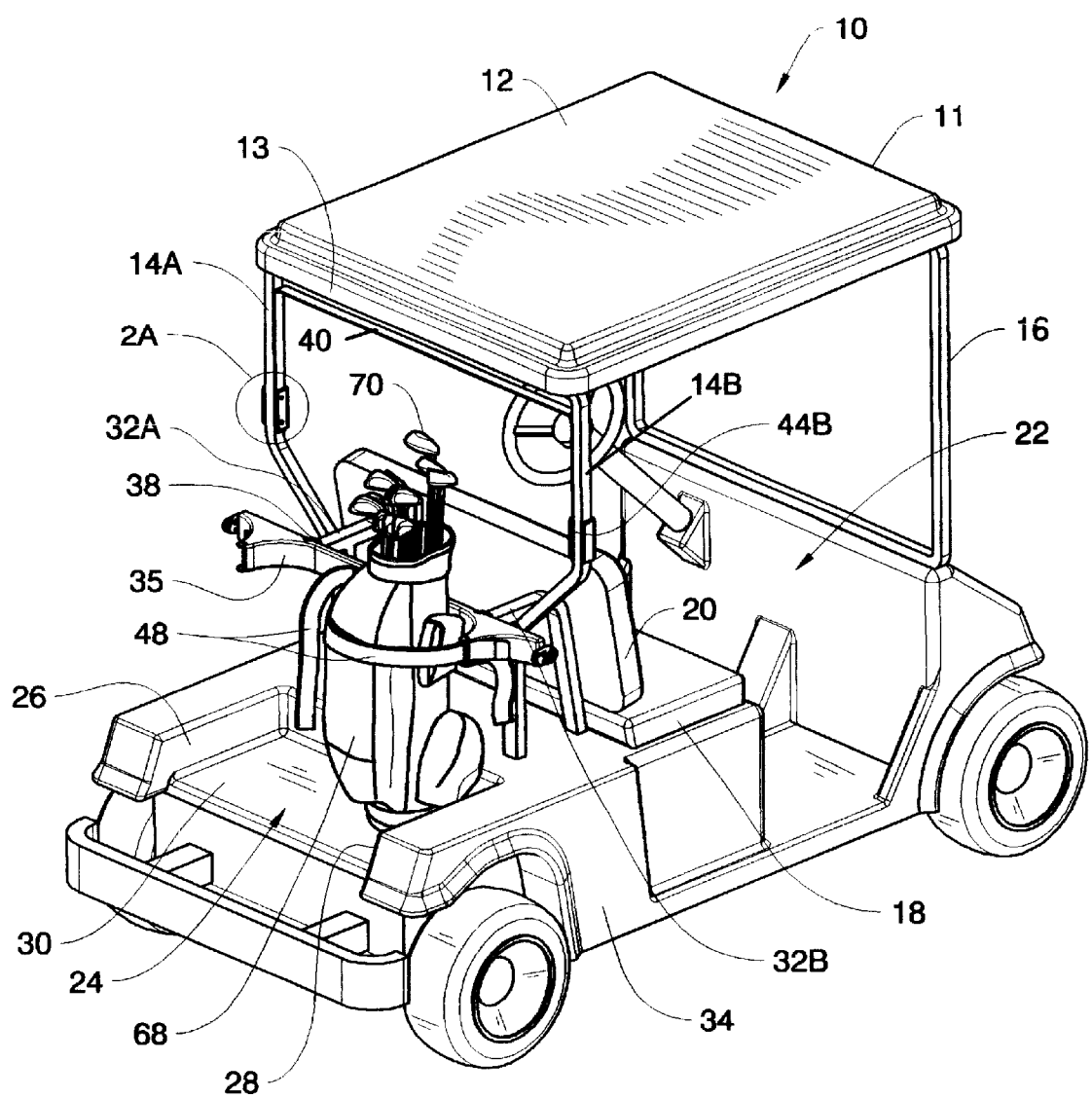
FIG. 2 is a rear perspective view of the golf cart with the front strut and the bracket assembly used for mounting the canopy secured to the cart's frame.

Top 12, shown in FIG. 2, has a front end 11 and a rear end 13 and is located above passenger compartment 22. The top does not cover the bag storage area to allow the player to remove golf clubs 70 from a golf bag 68 without hitting the golf clubs on the underside of top 12 while trying to lift the golf clubs out of the golf bag. Therefore, the bag storage area and the golf bag are exposed to rainfall. In order to protect bag storage area 24, it is desirable to have a cover that can be folded out of the way so that the player may remove the golf clubs without being hindered by a covering directly above golf bag 68.

Figure 2A:
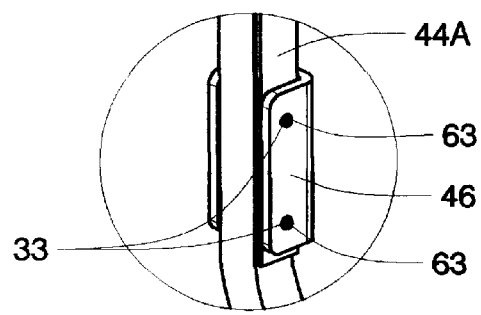
FIG. 2A is an enlarged view of an attachment mechanism used to mount the front strut member to the golf cart's frame that supports the top of the cart.
Figure 3:
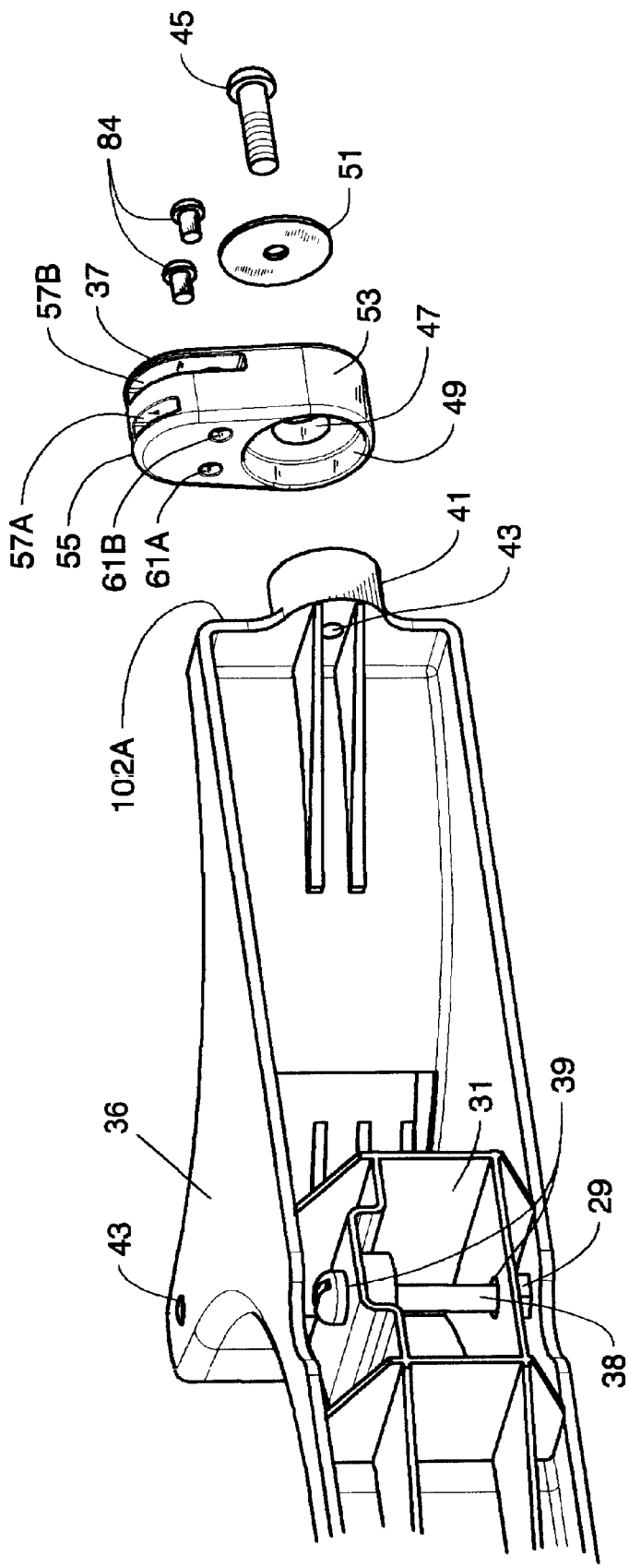
FIG. 3 is an enlarged view of the end of the support member.

FIGS. 2 and 2A show the components necessary to mount a foldable canopy assembly 42, shown in FIG. 4, to cart 10. A bracket assembly 35 has mounting features such as two rectangularly-shaped mount pockets 31, shown in FIG. 3, that are sized to receive frame extensions 32A and 32B. The frame extensions slide into the mount pockets. The bracket assembly is secured to the frame extensions using fasteners, such as bolts 38 passing through bolt holes 39 in a support member 36 and continuing through holes in the frame extensions (not shown). Nuts 29 are threaded onto each corresponding end of each bolt 38, as can be seen in FIG. 3.

It should be understood that the bracket assembly could be mounted to the frame extensions using flanges, stamped steel brackets or other types of mounting means integrated as part of or connected to support member 36 of bracket assembly 35. Frame extensions 32A and 32B are welded, bolted or otherwise connected to rear frame members 14A and 14B or can be attached to the cart's body. Frame extensions 32A and 32B can also serve to support seat back 20.

Bracket assembly 35 includes an elongated support member 36 and molded plastic pivot arms 37 that are pivotally attached to the ends of support member 36. Bracket assembly 35 may also include coupling members like straps 48 to secure the upper portion of the golf bag to the bracket assembly. Support member 36 and pivot arms 37 are preferably made from high strength molded plastic, as for example nylon.

Let it be known that a wide variety of alternative supporting members and alternative bracket assemblies exist. Other types of support members could be used such as support members that do not include straps for securing the golf bags. Additionally, the support member can be separate from the golf bag support member. Therefore, bracket assembly 35 and support member 36, shown in FIGS. 2–9, are shown for illustrative purposes only and may be replaced with another type of bracket assembly or support member that support the frame of the canopy.

Referring now to FIGS. 3 and 4, support member 36 has two opposing ends. Each end has a circular boss 41 extending outward, in the center of circular boss 41 is a screw bore 43 that has a diameter slightly smaller than the threads on a self-tapping screw 45. As shown in FIG. 3, pivot arm 37 has a pivot hole 47 that is used to pass screw 45 through to assemble the pivot arm onto support member 36. This my be accomplished by assembling a counter bore 49 over circular boss 41 and assembling a round washer 51 on screw 45 and self-tapping the screw into screw bore 43. In this way, pivot arm 37 is pivotally attached to the support member. The circular bosses are formed as an integral part of support member 36.

There are numerous other methods that could be used to pivotally connect pivot arms 37 to support member 36. The above described method offers a simple pivotal attachment joint for illustrative purposes, however, the screw could be replaced with a pin, rivet or other type of fastener. In addition, the circular bosses could also be eliminated and the pivot arm could rotate only around the fastener. Still further, pivot arms 37 could be eliminated.

With reference to FIGS. 3 and 4, pivot arm 37 is a single molded body with a mount end 53 that transitions to a receiving end 55. The receiving end has slots 57A and 57B that are sized to receive the ends of a strut 58 and a mid-strut 59 shown in FIG. 4. When the strut and mid-strut ends are fully inserted into the slots, clearance holes 61A and 61B in pivot arm 37 align with rivet holes (not shown) in the strut and mid-strut ends to allow strut 58 and mid-strut 59 to be secured in slots 57A and 57B by securing rivets 84 in the aligned holes.

It should be understood that there are a number of other ways to form a pivotal attachment between strut 58, mid-strut 59 and support member 36. Pivot arms 37 could be replaced with other attachment members made from metal or other materials. In addition, the pivot arms could be eliminated and the strut and mid-strut could be pivotally attached directly to support member 36, as for example the attachment shown in FIG. 9.

A front strut 40, shown in FIG. 2, is secured to an intermediate portion of rear frame members 14A and 14B that support top 12 of the golf cart. Front strut 40 is a generally U-shaped structural member having two opposing end portions 44A and 44B. As shown in FIG. 2A, end portions 44A and 44B are attached to rear frame members 14A and 14B using U-channels 46 that are sized to fit over rear frame members 14A and 14B with front strut 40 laying against the frame members, as shown. Setscrews 63 thread through threaded bores 33 in U-channel 46 and pass through clearance holes in the front strut 40 (not shown). The setscrews bottom against rear frame members 14A and 14B. In this way, the front strut is secured to an intermediate portion of the rear frame members supporting the top of the cart. The front strut provides structural support for a top edge 62 and front edges 64 of a canopy 50, shown in FIG. 4. Front strut 40 can be made from metal, such as tubing or flat metal stock, however, strong plastic would also work. U-channel 46 can be made from stamped or formed metal channels or may be molded from high strength plastic. Setscrews 63 can be made from metal or other high strength materials. The setscrews are tightened by the installer when front strut 40 is in the desired location. When the bottom of the setscrew contacts the surface of the frame members that support the cart top, U-channel 46 tightens against the frame members, holding the front strut in position.

There are numerous variations that could be made to front strut 40 and U-channel 46 without departing from the scope of the present invention. For example, the front strut could be made into a rectangular member having four sides. This member could be connected together to form a nearly continuous or entirely continuous rectangular loop. Front strut 40 could also be made from a number of sections secured together. Therefore, the illustrated and described front strut 40 could be replaced by another type of front strut that also provided structural support for at least upper top edge 62 of canopy 50, shown in FIG. 4. U-channel 46 and setscrews 63 could be replaced by U-bolt assemblies or other types of clamping mechanisms. In addition, the U-channel and the setscrew could be eliminated by directly mounting front strut 40 to rear frame members 14A and 14B supporting the top. This could be accomplished by using fasteners such as rivets, bolts, self-tapping screws, magnets, clamps or other types of fasteners to secure end portions 44A and 44B to rear frame members 14A and 14B. The front strut could also be mounted to other portions of frame assembly 27 that supports top 12, seat back 20 and golf bag support bracket 25 of the golf cart.

Turning now to a detailed discussion of canopy 50, shown in FIG. 4. Canopy 50 is defined by a canopy top 52, a canopy back 54 a right side 56A and an opposing left side 56B. The canopy has a bottom edge 60, top edge 62 and two vertical front edges 64 that define the limits of the canopy. The canopy serves as the rain shield portion of canopy assembly 42. Canopy 50 is made from a thin sheet of flexible water-resistant or waterproof material, as for example vinyl, nylon, canvas or plastic that may be sewn together.

With reference again to FIG. 4, strut 58 and mid-strut 59 provide a pivotal structural support for the canopy. Strut 58 is generally an U-shaped continuous support with opposite ends. The length of the strut corresponds to bag storage area 24 to ensure that the strut supports canopy 50 over the majority of the bag storage area when the canopy is in the extended position shown. The mid-strut is generally an U-shaped continuous support with opposing ends. The length of the mid-strut corresponds to the amount of clearance desired between the canopy and the golf clubs and the shape of the canopy that it supports. Both the strut and the mid-strut are preferably made of a semi-rigid material like metal or a high strength plastic, as for example molded nylon. Strut 58 passes through a sewn strut sleeve 66A and mid-strut 59 passes through a sewn mid-strut sleeve 66B in the canopy to locate them in the desired position within canopy 50. In this way, the canopy is attached to strut 58 and mid-strut 59.

Figure 5:
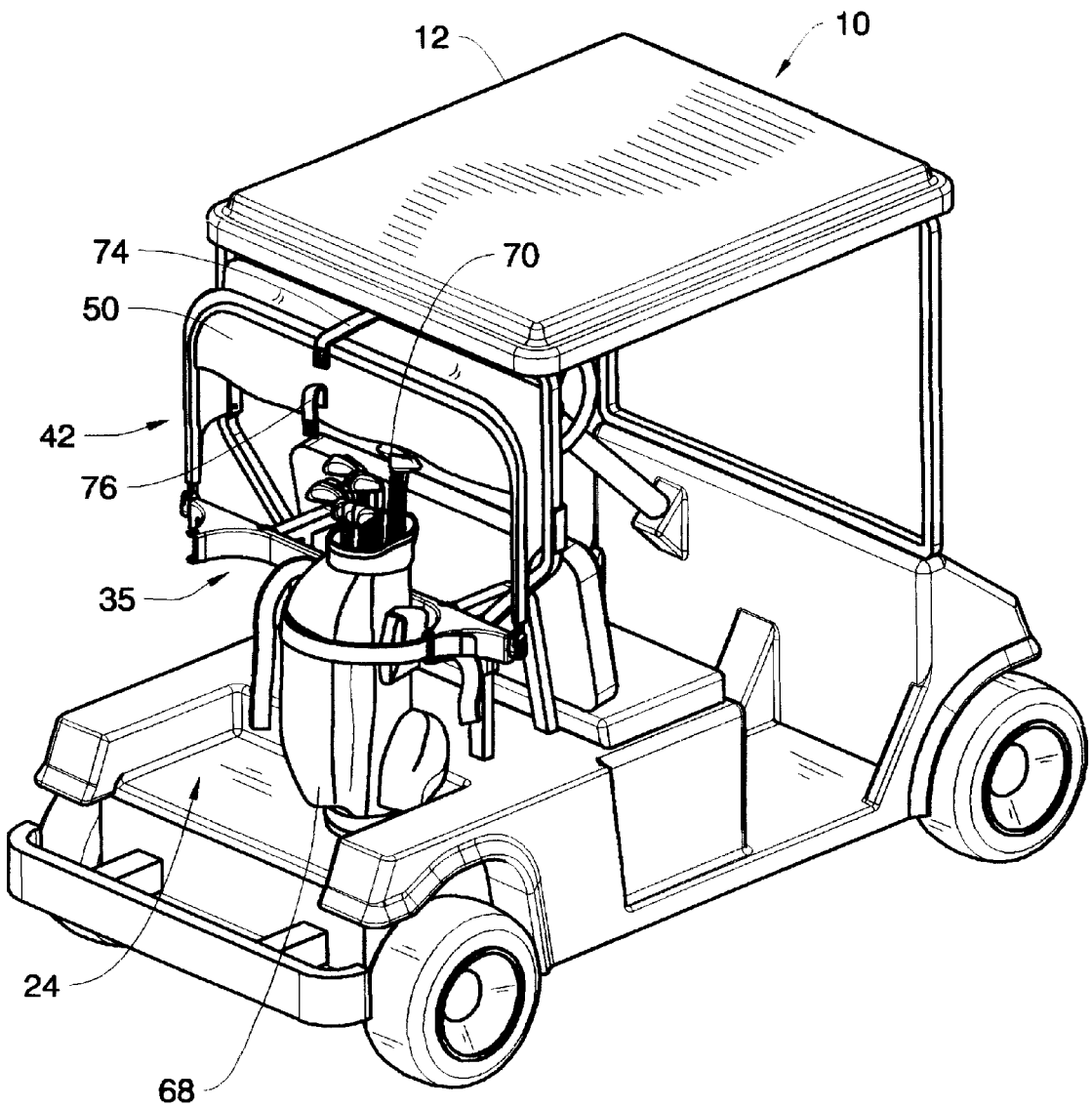
FIG. 5 is a rear perspective view of the golf cart with the embodiment of the present invention, shown in FIG. 4, folded up to allow access to the golf clubs.

As an alternative, the strut and mid-strut could be attached to the canopy using other fastening methods as for example hook and loop fasteners, snaps or other fastening means. Strut 58 and mid-strut 59 together makeup the pivotal frame structure for supporting canopy 50. The ends of strut 58 and mid-strut 59 are connected to pivot arm 37, as previously described. Pivot arms 37 are pivotally connected to the ends of support member 36. In this way, the strut and mid-strut can be pivoted relative to the support member to allow canopy 50 to be folded up, as shown in FIG. 5. Strut 58, mid-strut 59 and front strut 40 cooperate to form the frame structure for canopy 50, giving the canopy shape and support.

Referring now to FIGS. 3 and 4, top edge 62 and front edges 64 of canopy 50 are supported by front strut 40. The front strut is passed through a front strut sleeve 72 before the front strut is connected onto the golf cart using U-channel 46, shown in FIG. 2. In this way, top edge 62 of canopy 50 is secured to front strut 40 to provide structural support for the top edge. The front strut is positioned so that it is under cart top 12. In this way, top edge 62 of canopy 50 is located in front of rear end 13 of cart top 12 so that the cart top hangs over the top edge of the canopy, preventing rainfall from dripping down onto the bag storage area. Other fastening methods could be used to secure front strut 40 to canopy 50 without departing from the scope of the present invention. For example, front strut 40 could be attached to the canopy using hook and loop fastening strips, snaps, ties or other fastening means.

With reference again to FIG. 4, canopy assembly 42 is attached to cart 10 and is extended to protect golf bag 68 and golf clubs 70 from adverse weather conditions like rainfall. In the extended position shown, canopy 50 is taunt from front strut 40, stretching over mid-strut 59 and down over strut 58. In this way, canopy 50 covers bag storage area 24 and remains in this position due to the weight of the canopy, strut 58 and mid-strut 59.

With reference to FIG. 5, canopy assembly 42 is attached to cart 10 and is shown in a folded up position to allow access to golf bag 68 and golf clubs 70. Canopy 50 is folded up from the extended position, shown in FIG. 4, by gripping the bottom of canopy 50 near strut 58 and lifting the strut upwardly, toward the back of top 12 on golf cart 10. The moment force created from this lifting action causes pivot arms 37 to rotate around circular bosses 41 on support member 36. At approximately the halfway point of folding up the canopy, mid-strut 59 begins to rotate upwardly toward the back of top 12. When the lifting action is complete, as shown in FIG. 5, both strut 58 and mid-strut 59 are substantially vertical. The user may secure canopy 50 in this position by fastening a hook strap 74 to a loop strap 76. Hook strap 74 is sewn or otherwise attached near the top edge 62 of canopy 50 and loop strap 76 is sewn or otherwise attached near bottom edge 60. In this way, the canopy is retained in the folded position shown by the hook and loop straps. Other types of retaining mechanisms may be used to retain the canopy in the folded position without departing from the scope of the present invention. For example, the hook and loop straps can be replaced with a sprung mechanism urging the struts to stay folded, tie straps, straps with snaps, or other connecting means.

The player may extend the canopy by separating hook strap 74 from loop strap 76 and pulling bottom edge 60 of canopy 50 near strut 58 downwardly and toward the back of the cart. This will extend the cover over bag storage area 24, as shown in FIG. 4, providing rain protection for the golf bag and golf clubs.

Figure 6:
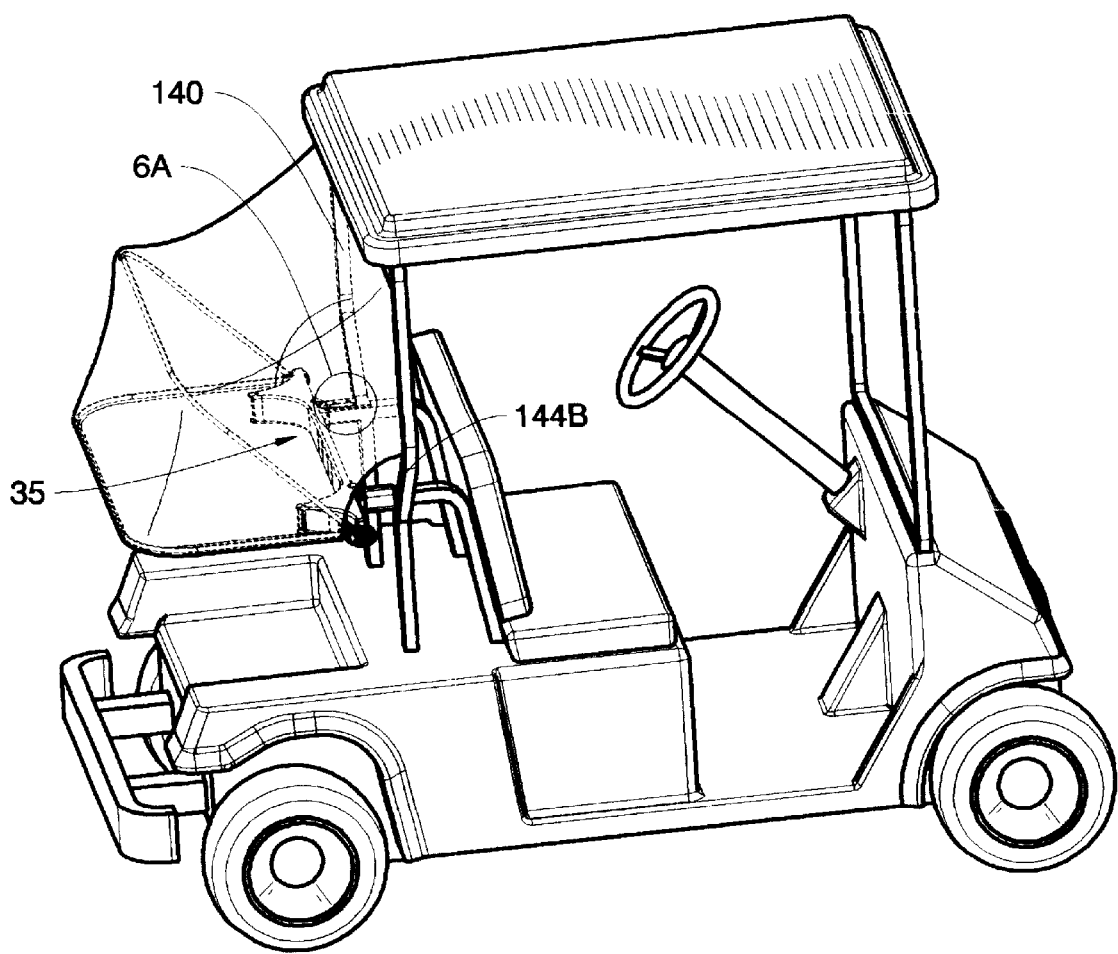
FIG. 6 is a perspective view of the golf cart with a second embodiment of the present invention, a canopy assembly, attached to the golf cart.
Figure 6A:
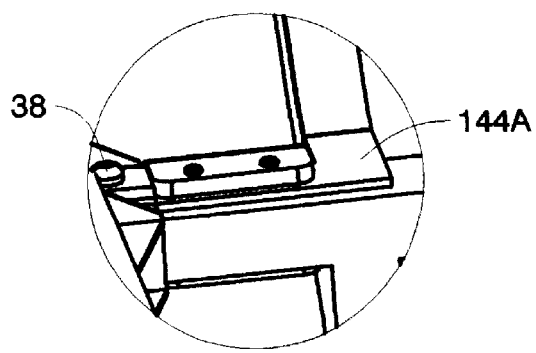

A second embodiment of the present invention is shown in FIG. 6. A modified front strut 140 has modified end portions 144A and 144B clamped to frame extensions 32A and 32B between rear frame members 14A and 14B and bracket assembly 35. In this embodiment, U-channel 46 and setscrews 63 could be replaced by U-bolt assemblies or other types of clamping mechanisms. In addition, the U-channel and the setscrew could be eliminated by directly mounting modified front strut 140 to frame extensions 32A and 32B. This could be accomplished by using fasteners such as rivets, bolts, self-tapping screws, magnets, clamps or other types of fasteners to secure modified end portions 144A and 144B to frame extensions 32A and 32B. Modified front strut 140 performs the same function as front strut 40, shown in the original embodiment.

Figure 7:
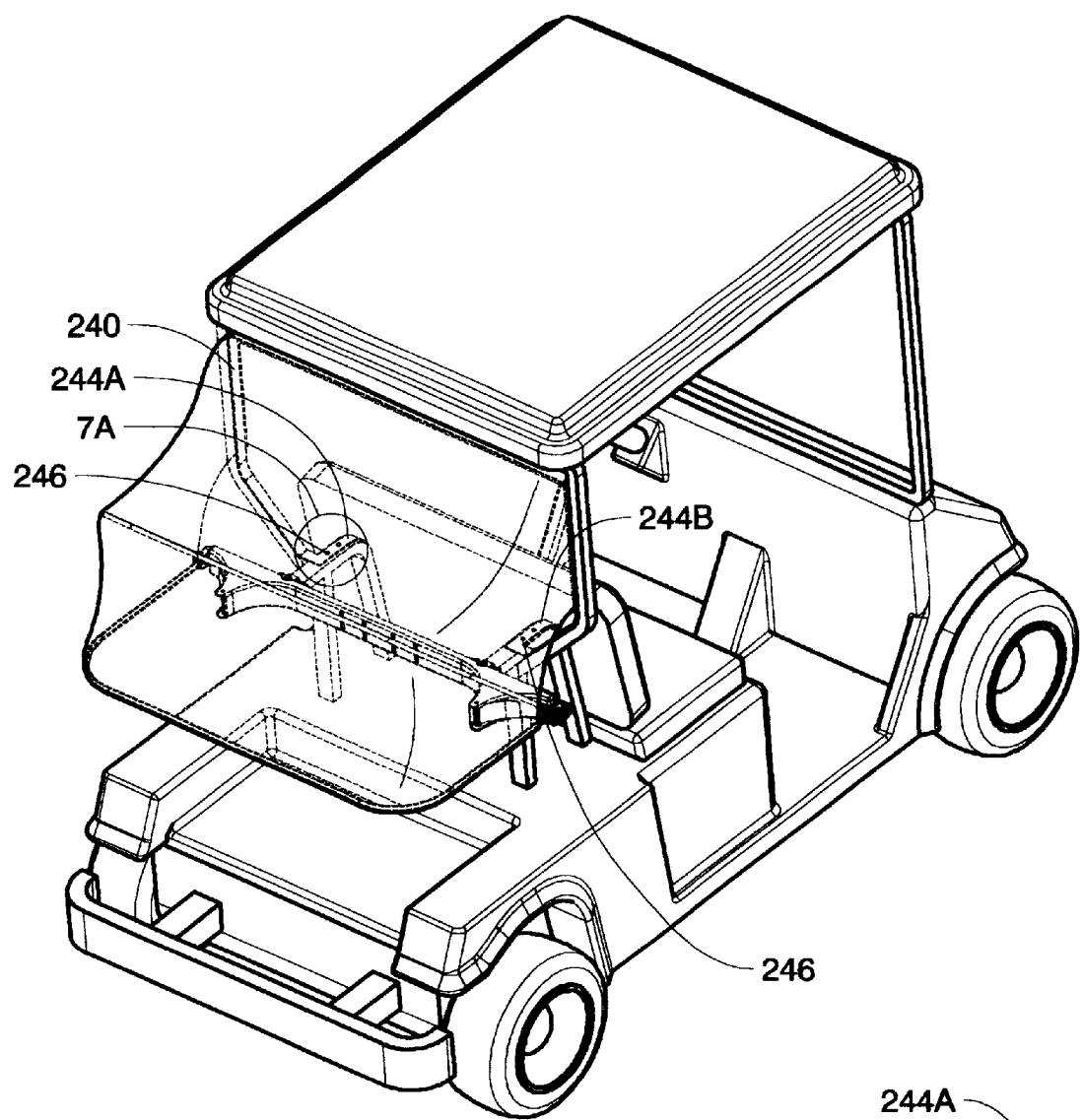
FIG. 7 is a perspective view of the golf cart with a third embodiment of the present invention, a canopy assembly, attached to the golf cart.
Figure 7A:
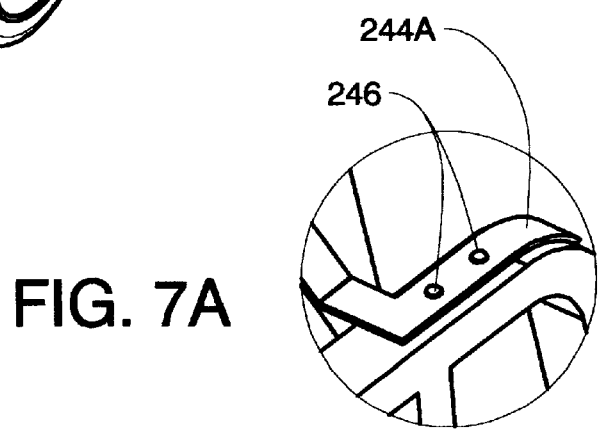

A third embodiment of the present invention is shown in FIG. 7. A second modified front strut 240 has second modified end portions 244A and 244B that are riveted to frame extensions 32A and 32B between rear frame members 14A and 14B and seat back 20 using rivets 246. Rivets 246 could be replaced by other fasteners or clamping mechanisms such as U-bolts.

Figure 8:
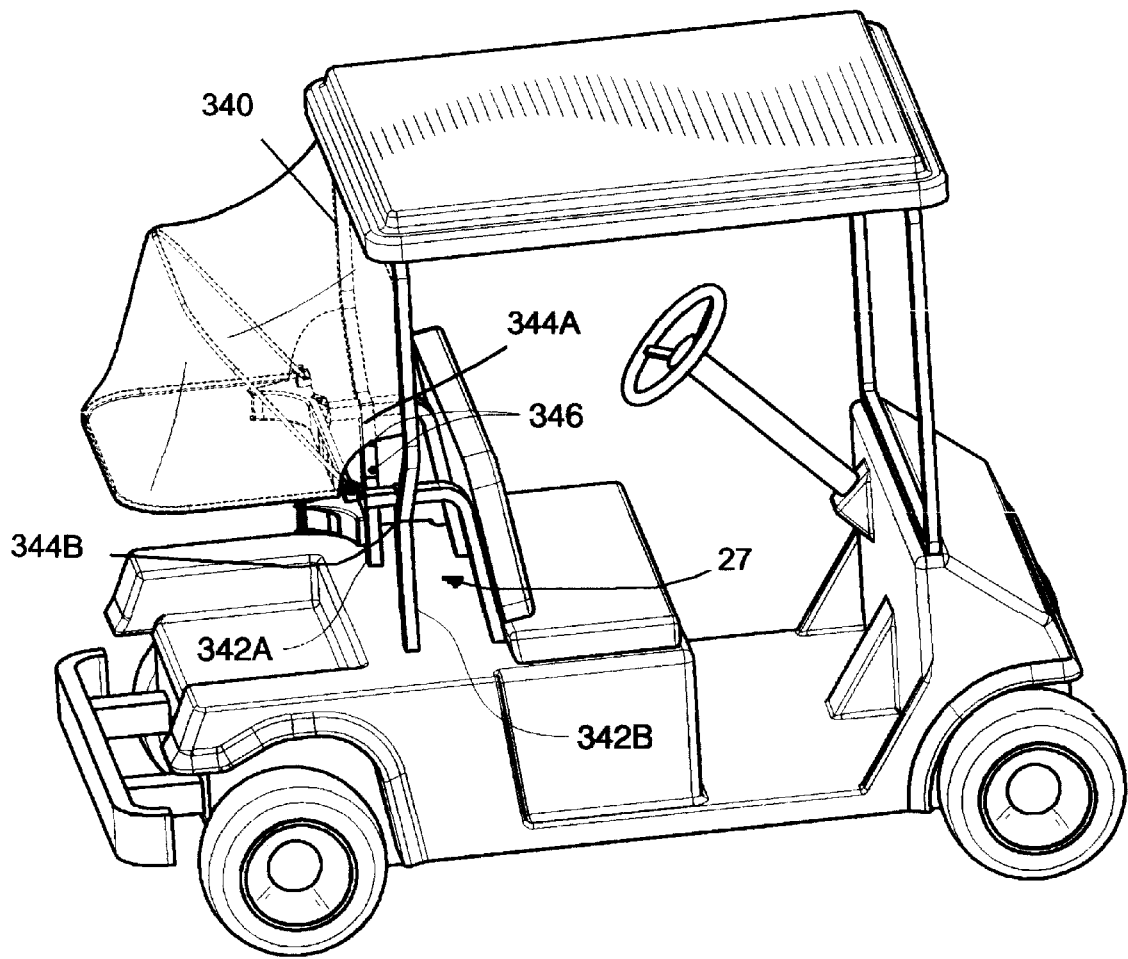
FIG. 8 is a perspective view of the golf cart with a fourth embodiment of the present invention, a canopy assembly, attached to the golf cart.

A fourth embodiment of the present invention is shown in FIG. 8. A third modified front strut 340 has third modified end portions 344A and 344B (not shown) that are bolted to golf bag storage frames 342A and 342B using strut bolts 346 that are part of frame assembly 27 located between frame extensions 32A and 32B and body 34 of cart 10. Strut bolts 346 could be replaced by other fasteners or clamping mechanisms such as U-bolts.

Figure 9:
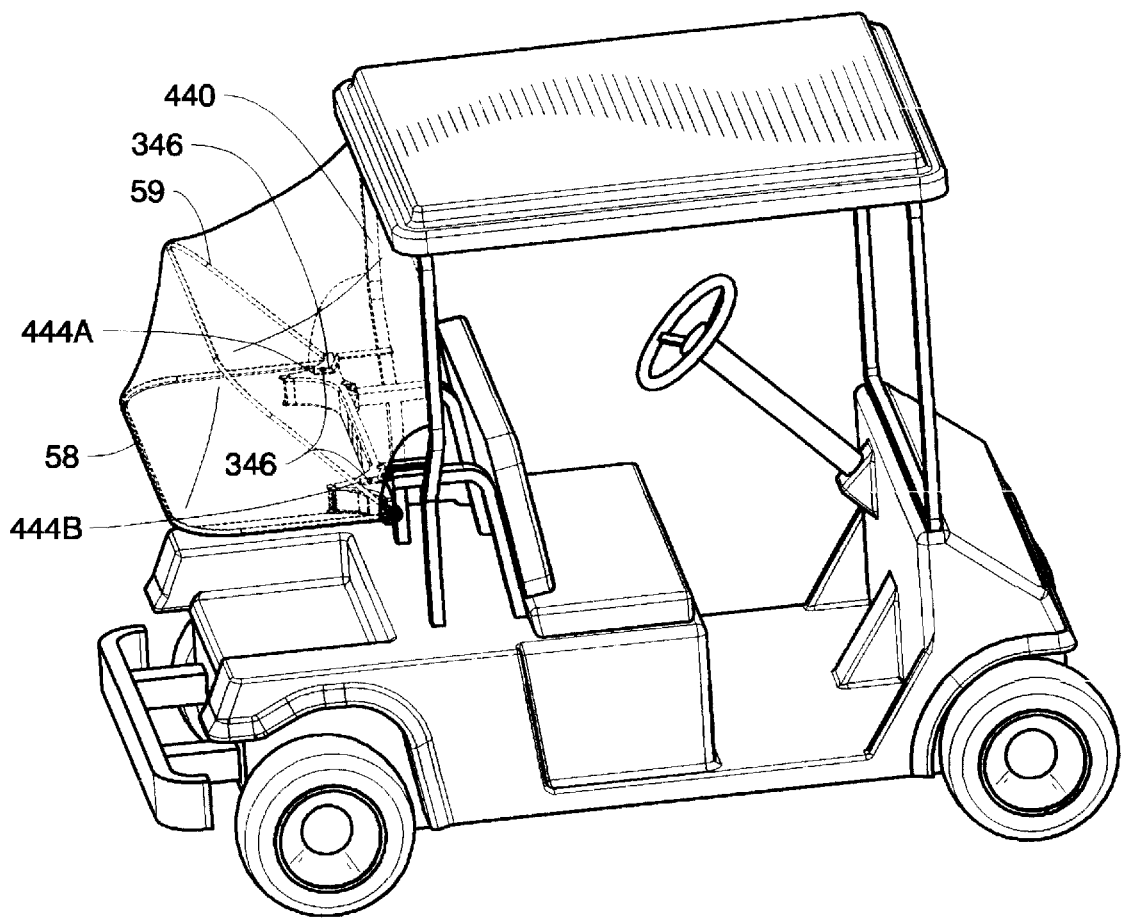
FIG. 9 is a perspective view of the golf cart with a fifth embodiment of the present invention, a canopy assembly, attached to the golf cart.

A fifth embodiment of the present invention is shown in FIG. 9. A fourth modified strut 440 is shown having fourth modified end portions 444A and 444B that attach to the top of bracket assembly 35 using strut bolts 346. In addition, pivot arms 37 have been eliminated and the ends of strut 58 and mid-strut 59 pivotally attach directly to bracket assembly 35. Strut bolts 346 could be replaced by other fasteners or clamping mechanisms such as U-bolts.

While the invention has been described in connection with one or more embodiments, it is to be understood that the specific mechanisms and techniques which have been described or shown are for illustrative purposes only to provide a basic understanding of the invention, many modifications may be made to the invention described without deviating from the scope of the invention. Thus the scope of the invention should be determined by the appended claims and their legal equivalents, rather than by the examples given.

What is claimed is:

1. A canopy assembly for attaching a rearwardly extending canopy to a golf cart having a passenger compartment, a seat, a golf bag compartment located rearwardly of said passenger compartment, a golf bag support bracket, a top, a frame assembly located rearwardly of said passenger compartment, said frame assembly supporting said seat, said top and said golf bag support bracket, said top being positioned over said passenger compartment, said canopy assembly being moveable between an extended first position where it at least partially covers said golf bag compartment and a folded second position where it is folded out of the way to allow access to said golf bag compartment, said canopy assembly comprising:

a canopy having a top edge, a bottom edge and sides;
a substantially U-shaped front strut for structurally supporting said top edge of said canopy, said front strut being directly attached to the frame assembly of the golf cart;
fastening means attaching said front strut to said top edge of said canopy;
a pivotal frame structure supporting said canopy;
a support member supporting said pivotal frame structure, said pivotal frame structure being pivotally attached to said support member; and
mounting means securing said support member to the golf cart.

2. A canopy assembly according to claim 1 wherein said front strut is directly attached to the frame assembly of the golf cart using a clamping mechanism.

3. A canopy assembly according to claim 2 wherein said clamping mechanism includes U-channels sized to fit a portion of the frame assembly.

4. A canopy assembly according to claim 1 wherein said front strut is directly attached to the frame assembly of the golf cart using fasteners.

5. A canopy assembly according to claim 1 wherein said support member includes straps for securing a golf bag to said support member.

6. A canopy assembly according to claim 1 wherein said mounting means secures said support member to the frame assembly of the golf cart.

7. A canopy assembly according to claim 1 wherein said pivotal frame structure includes at least one rigid U-shaped bracket.

8. A canopy assembly according to claim 1 wherein said front strut is made of one continuous strip of metal.

9. A canopy assembly for attaching a rearwardly extending canopy to a golf cart having a frame, a passenger compartment, a golf bag compartment located rearwardly of said passenger compartment, a top assembly including a top positioned over said passenger compartment and additionally including front and rear laterally spaced apart and vertically extending frame members supporting said top, said canopy assembly being moveable between an extended first position where it at least partially covers said golf bag compartment and a folded second position where it is folded out of the way to allow access to said golf bag compartment, said canopy assembly comprising:

a canopy having a top edge, a bottom edge and sides;
a front strut for structurally supporting said top edge of said canopy, said front strut being directly attached to an intermediate portion of the rear frame members supporting the top of the golf cart;
fastening means attaching said front strut to said top edge of said canopy;
a pivotal frame structure supporting said canopy;
a support member supporting said pivotal frame structure, said pivotal frame structure being pivotally attached to said support member; and
mounting means securing said support member to the golf cart.

10. A canopy assembly according to claim 9 wherein said front strut is directly attached to the rear frame members of the golf cart using a clamping mechanism.

11. A canopy assembly according to claim 9 wherein said front strut is directly attached to the rear frame members of the golf cart using fasteners.

12. A canopy assembly according to claim 9 wherein said mounting means secures said support member to the frame of the golf cart.

13. A canopy assembly according to claim 9 wherein said pivotal frame structure includes at least on e rigid U-shaped bracket.

14. A canopy assembly according to claim 9 wherein said front strut is made of one continuous strip of metal.

15. A canopy assembly for attaching a rearwardly extending canopy to a golf cart having a passenger compartment, a golf bag compartment located rearwardly of said passenger compartment, a golf bag support bracket, a top assembly including a top positioned over said passenger compartment and additionally including front and rear laterally spaced apart and vertically extending frame members supporting said top, said canopy assembly being moveable between an extended first position where it at least partially covers said golf bag compartment and a folded second position where it is folded out of the way to allow access to said golf bag compartment, said canopy assembly comprising:

a canopy having a top edge, a bottom edge and sides;
a front strut for structurally supporting said top edge of said canopy, said front strut being attached to the golf bag support bracket of the golf cart;
fastening means attaching said front strut to said top edge of said canopy;
a pivotal frame structure supporting said canopy;
a support member supporting said pivotal frame structure, said pivotal frame structure being pivotally attached to said support member; and
mounting means securing said support member to the golf cart.

16. A canopy assembly according to claim 15 wherein said front strut is attached to the golf bag support bracket using a clamping mechanism.

17. A canopy assembly according to claim 15 wherein said front strut is attached to the golf bag support bracket using fasteners.

18. A canopy assembly according to claim 15 wherein said mounting means secures said support member to the frame of the golf cart.

19. A canopy assembly according to claim 1 wherein said front strut is directly attached to and between the frame assembly of the golf cart.

20. A canopy assembly according to claim 1 wherein said front strut is positioned beneath the cart top.

21. A canopy assembly according to claim 9 wherein said front strut is directly attached to and between an intermediate portion of the rear frame members supporting the top of the golf cart.

22. A canopy assembly according to claim 9 wherein said front strut is positioned beneath the cart top.

23. A canopy assembly according to claim 15 wherein said front strut is positioned beneath the cart top.

24. A canopy assembly for attaching a rearwardly extending canopy to a golf cart having a passenger compartment, a seat, a golf bag compartment located rearwardly of said passenger compartment, a golf bag support bracket, a top, a frame assembly located rearwardly of said passenger compartment, said frame assembly supporting said seat, said top and said golf bag support bracket, said top being positioned over said passenger compartment, said canopy assembly being moveable between an extended first position where it at least partially covers said golf bag compartment and a folded second position where it is folded out of the way to allow access to said golf bag compartment, said canopy assembly comprising:

a canopy having a top edge, a bottom edge and sides;

a front strut for structurally supporting said top edge of said canopy, said front strut having a first end portion and a second end portion, wherein said first and said second end portions are directly fastened to the frame assembly of the golf cart;

fastening means attaching said front strut to said top edge of said canopy;

a pivotal frame structure supporting said canopy;

a support member supporting said pivotal frame structure, said pivotal frame structure being pivotally attached to said support member; and mounting means securing said support member to the golf cart.

25. A canopy assembly according to claim 24 wherein said front strut is positioned beneath the cart top.

* * * * *